US012681518B2

(12) United States Patent
Darfeuille et al.

(10) Patent No.: US 12,681,518 B2
(45) Date of Patent: Jul. 14, 2026

(54) VOLTAGE REGULATOR WITH SEPARATELY SELECTABLE OUTPUT STAGE UNITS AND METHOD OF CONFIGURING THE SAME

(71) Applicant: NXP B.V., Eindhoven (NL)

(72) Inventors: Sebastien Darfeuille, Graz (AT); Marco Lammers, Neerkant (NL)

(73) Assignee: NXP B.V., Eindoven (NL)

( * ) Notice: Subject to any disclaimer, the term of this patent is extended or adjusted under 35 U.S.C. 154(b) by 175 days.

(21) Appl. No.: 18/421,300

(22) Filed: Jan. 24, 2024

(65) Prior Publication Data

US 2024/0264618 A1 Aug. 8, 2024

(30) Foreign Application Priority Data

Feb. 8, 2023 (EP) .................................... 23155620

(51) Int. Cl.

| | |
|---|---|
| ***G05F 1/56*** | (2006.01) |
| ***G05F 1/46*** | (2006.01) |
| ***G05F 1/565*** | (2006.01) |
| ***G05F 1/575*** | (2006.01) |
| ***G05F 1/59*** | (2006.01) |

(52) U.S. Cl.

CPC .............. *G05F 1/565* (2013.01); *G05F 1/467* (2013.01); *G05F 1/468* (2013.01); *G05F 1/575* (2013.01); *G05F 1/59* (2013.01)

(58) Field of Classification Search

CPC .......... G05F 1/565; G05F 1/467; G05F 1/468; G05F 1/575; G05F 1/59

See application file for complete search history.

(56) References Cited

U.S. PATENT DOCUMENTS

| | | | | |
|---|---|---|---|---|
| 9,170,590 | B2 | 10/2015 | Price et al. | |
| 2009/0322297 | A1* | 12/2009 | Shiota | G05F 1/59 323/282 |
| 2010/0066320 | A1* | 3/2010 | Dasgupta | G05F 1/56 323/273 |
| 2014/0062442 | A1* | 3/2014 | Seymour | G06F 1/30 323/283 |
| 2016/0259354 | A1 | 9/2016 | Maeng et al. | |
| 2022/0149792 | A1* | 5/2022 | Jaladanki | H03F 3/45192 |
| 2024/0178688 | A1* | 5/2024 | Binder | H02J 7/855 |

OTHER PUBLICATIONS

Santra et al., A Highly Scalable, Time-Based Capless Low-Dropout Regulator Using Master-Slave Domino Control, 2019 IEEE International Symposium on Circuits and Systems (ISCAS), May 26-29, 2019, 4 pages.

(Continued)

*Primary Examiner* — Lakaisha Jackson

(57) ABSTRACT

In accordance with a first aspect of the present disclosure, a voltage regulator is provided, comprising: a core and an output stage configured to be coupled to the core, wherein said output stage comprises a set of output stage units; a switch unit comprising a plurality of controllable switches, wherein said controllable switches are configured to couple subsets of the set of output stage units to the core. In accordance with a second aspect of the present disclosure, a corresponding method of configuring a voltage regulator is conceived.

19 Claims, 13 Drawing Sheets

(56) References Cited

OTHER PUBLICATIONS

Liu et al., "A Universal Modular Hybrid LDO With Fast Load Transient Response and Programmable PSRR in 14-nm CMOS Featuring Dynamic Clamp Strength Tuning," in IEEE Journal of Solid-State Circuits, vol. 56, No. 8, pp. 2402-2415, Aug. 2021.

Huang et al., "Review of Analog-Assisted-Digital and Digital-Assisted-Analog Low Dropout Regulators," in IEEE Transactions on Circuits and Systems II: Express Briefs, vol. 68, No. 1, pp. 24-29, Jan. 2021.

* cited by examiner

-PRIOR ART-

-PRIOR ART-

-PRIOR ART-

VOLTAGE REGULATOR WITH SEPARATELY SELECTABLE OUTPUT STAGE UNITS AND METHOD OF CONFIGURING THE SAME

CROSS-REFERENCE TO RELATED APPLICATIONS

This application claims priority under 35 U.S.C. § 119 from European Patent application no. 23155620.0, filed on 8 Feb. 2023, the contents of which are incorporated by reference herein.

TECHNICAL FIELD

The present disclosure relates to a voltage regulator. Furthermore, the present disclosure relates to a corresponding method of configuring a voltage regulator.

BACKGROUND

Analog voltage regulators should typically operate over wide ranges of supply voltages and load currents. At the same time, they should reach acceptable levels of power-supply rejection, transient load regulation and noise. Designing a unique cell that can be used at multiple locations to cover the needs of various analog blocks inside a given integrated circuit (IC) is then a difficult task, and will often lead to sub-optimal results. Indeed, such a voltage regulator would have to fulfil the combined requirements of all applications in which it is used. The result would be a cell that requires a lot of current and silicon area, which for most cases would not be required. A reasonable trade-off is a scalable design approach based on a common core and a modular output stage. The latter can be placed multiple times in a parallel arrangement until the required current capability is reached for a given use case. Generally speaking, this modular output stage requires a quiescent current which is used for the purpose of biasing. Furthermore, the quiescent current helps stabilizing the voltage regulator when the output load is idle with little or no current consumption. Besides being able to be switched on and off, a circuit supplied by a voltage regulator may be able to operate in multiple operating modes with significantly different needs in terms of current consumption. On the other hand, the voltage regulator should be able to cope with the maximum load, and so the number of output stages used in that case will be based on this worst case. Then, even if (for example) only half of the maximum current load capability is required in a certain operating mode, all the output stages are still enabled and result in a higher current consumption due to internal biasing.

SUMMARY

In accordance with a first aspect of the present disclosure, a voltage regulator is provided, comprising: a core and an output stage configured to be coupled to the core, wherein said output stage comprises a set of output stage units; a switch unit comprising a plurality of controllable switches, wherein said controllable switches are configured to couple subsets of the set of output stage units to the core.

In one or more embodiments, at least one of said subsets comprises a single output stage unit.

In one or more embodiments, at least one of said subsets comprises multiple output stage units.

In one or more embodiments, the voltage regulator further comprises a programmable compensation network, wherein said programmable compensation network is configured to be coupled to the output stage.

In one or more embodiments, the programmable compensation network comprises a variable resistor.

In one or more embodiments, the switch unit is configured to be controlled such that the subsets of output stage units are coupled to the core in dependence on an operating mode of an integrated circuit in which the voltage regulator is used.

In one or more embodiments, the switch unit is configured to be controlled such that different numbers of output stage units are coupled to the core for each one of a plurality of different operating modes of an integrated circuit in which the voltage regulator is used.

In one or more embodiments, each of the subsets comprises a predefined, fixed number of output stage units.

In one or more embodiments, the output stage units are grouped into the subsets according to a binary weighted scheme.

In one or more embodiments, the voltage regulator is a low-dropout voltage regulator.

In one or more embodiments, an integrated circuit comprises a voltage regulator of the kind set forth.

In accordance with a second aspect of the present disclosure, a method of configuring a voltage regulator is conceived, the method comprising: providing the voltage regulator with a core; providing the voltage regulator with an output stage configured to be coupled to the core, wherein said output stage comprises a set of output stage units; providing the voltage regulator with a switch unit, wherein the switch unit comprises a plurality of controllable switches, and wherein said controllable switches are configured to couple subsets of the set of output stage units to the core.

In one or more embodiments, at least one of said subsets comprises a single output stage unit.

In one or more embodiments, at least one of said subsets comprises multiple output stage units.

In one or more embodiments, the method further comprises providing the voltage regulator with a programmable compensation network, wherein said programmable compensation network is configured to be coupled to the output stage.

DESCRIPTION OF DRAWINGS

Embodiments will be described in more detail with reference to the appended drawings.

DESCRIPTION OF EMBODIMENTS

Figure 1:
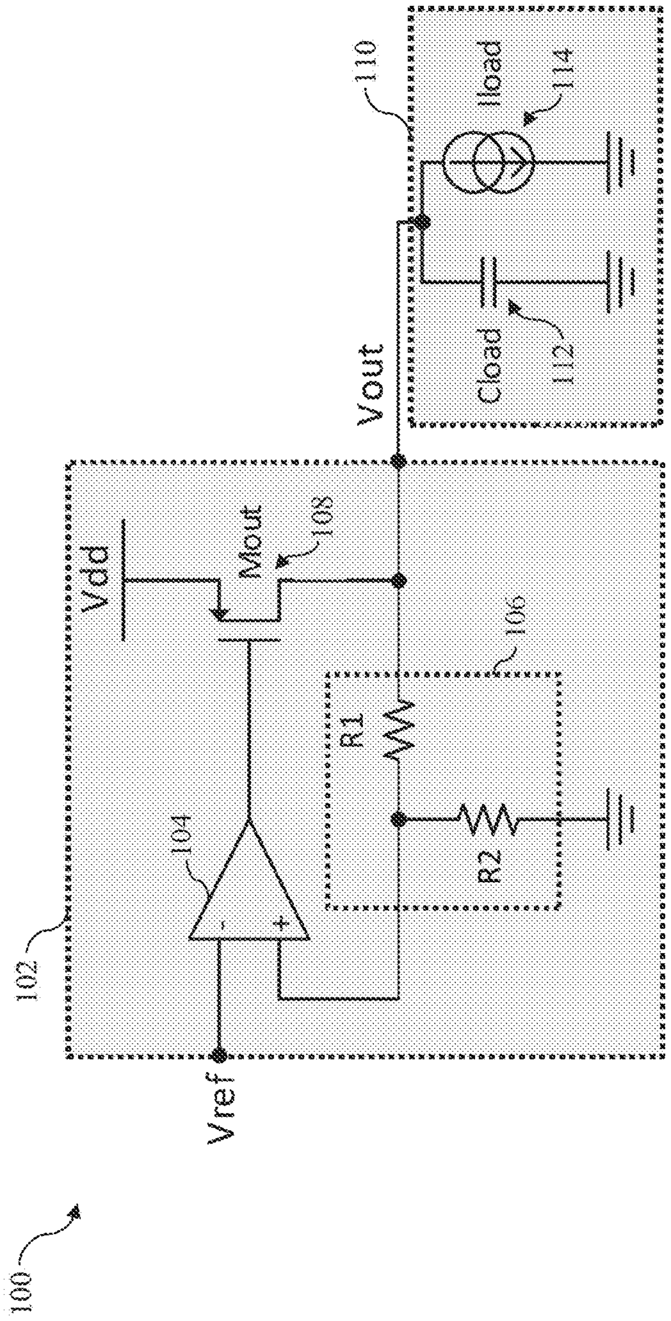
FIG. 1 shows a typical application of a voltage regulator inside a system on a chip.

FIG. 1 shows a typical application 100 of a voltage regulator inside a system on a chip (SoC). The SoC comprises a voltage regulator 102 and a supplied circuit 110, wherein the voltage regulator 102 is configured to supply power to the supplied circuit 110. The supplied circuit 110 represents a load on the voltage regulator 102. A generic voltage regulator serves the purpose of providing a fixed voltage to a given load from a supply which can vary. It therefore ensures that the load does not see levels that could cause physical damage to it and can isolate it from supply ripples that could degrade the performance. As shown in FIG. 1, a voltage regulator typically comprises an amplifier 104, an output transistor 108 and a resistive divider 106. It is noted that the voltage regulator 102 is based on a p-channel metal oxide semiconductor (PMOS) as the power device, but the skilled person will appreciate that other topologies, for example based on an n-channel metal oxide semiconductor (NMOS) or on a flipped voltage follower (FVF) topology, are also be possible. The circuit 110 supplied by the voltage regulator 102 regulator can be represented by capacitance Cload 112 in parallel with a load current Iload 114. If the output voltage Vout is at the intended level the voltage at the output of the resistive divider 106 will be equal to a stable reference voltage Vref and the output of the amplifier 104 will remain unchanged. If on the other hand Vout is too high or too low, then the feedback voltage will not be equal to the reference voltage and the output of the amplifier 104 will change accordingly, thereby correcting the output transistor gate voltage in order to bring back Vout on target. During operation such corrections are continuously carried out, as Iload and Vdd may vary.

Figure 2A:
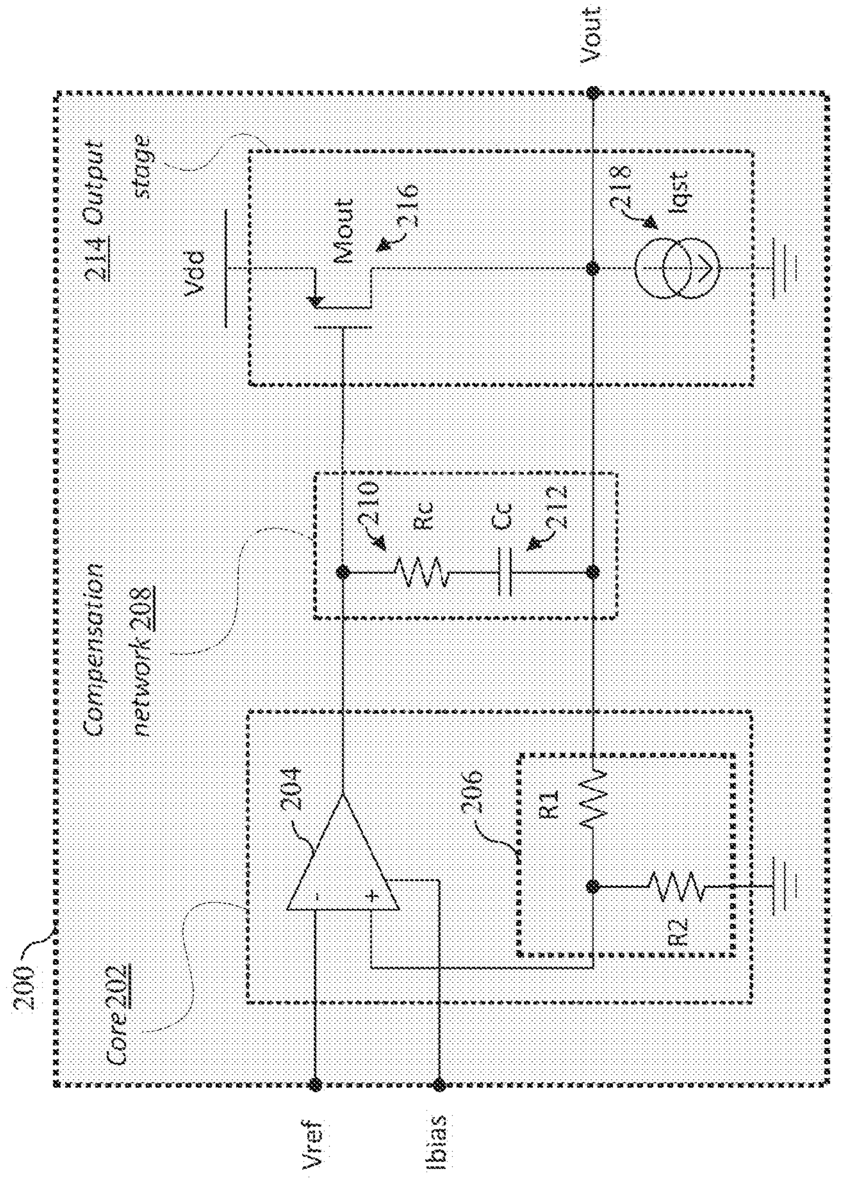
FIGS. 2A and 2B show an example of a voltage regulator.
Figure 2B:
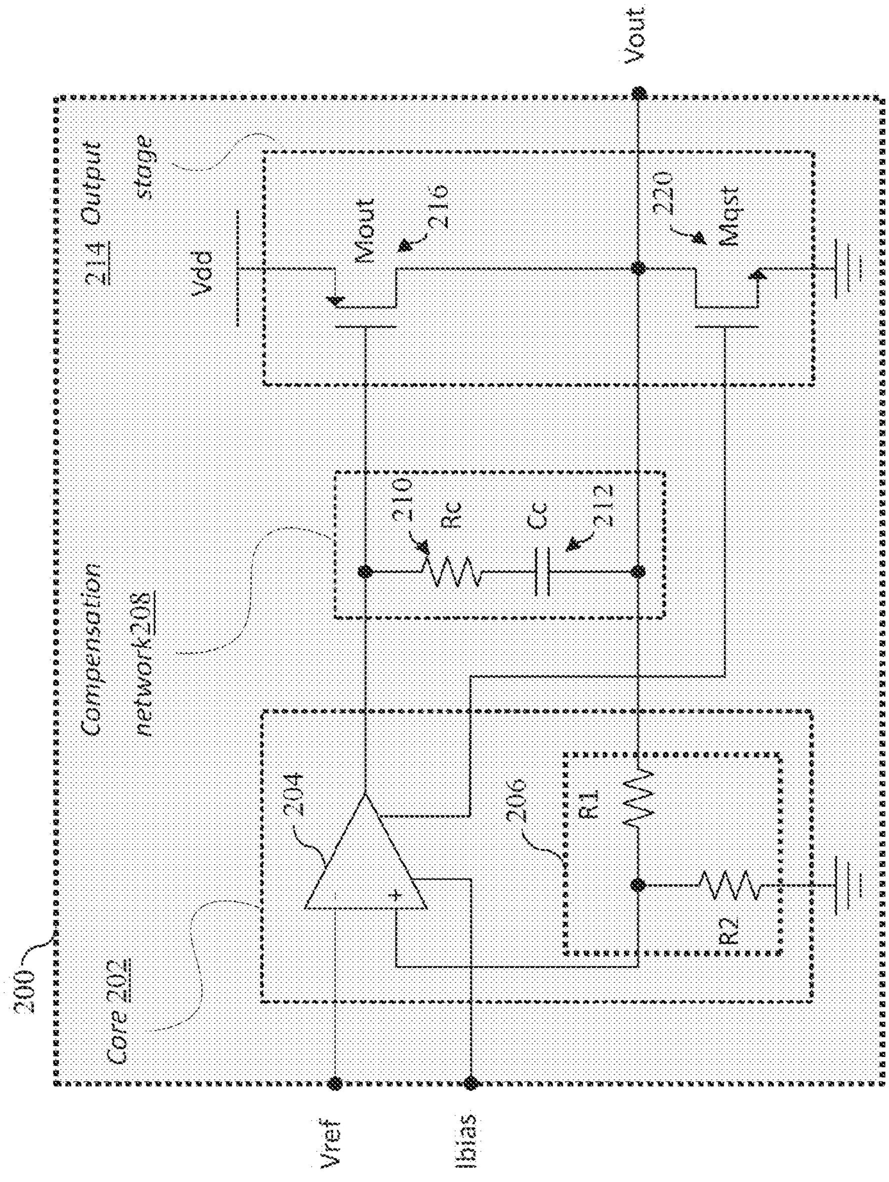

FIGS. 2A and 2B show an example of a voltage regulator 200. In particular, the voltage regulator 200 represents an example of an implementation of a typical voltage regulator as used in a system on a chip. The voltage regulator 200 comprises a core 202, which in turn comprises an amplifier 204 and a resistive divider 206. Furthermore, the voltage regulator 200 comprises an output stage 214 and a compensation network 208 coupled between the core 202 and the output stage 214. The compensation network 208 comprises a resistor 210 and a capacitor 212. The output stage 214 comprises an output transistor 216 and quiescent current source 218. In FIG. 2B, the latter is represented by a quiescent current transistor 220, having a gate coupled to an output of the amplifier 204. As in FIG. 1, the voltage regulator 200 shown in FIGS. 2A and 2B uses a PMOS power device. It is noted that the use of a quiescent current transistor, as a configuration for providing the quiescent current, facilitates switching on and off output stage sections and place many of them in parallel. Thus, it facilitates building a voltage regulator having a modular arrangement, as shown for example in FIG. 3.

Since the circuit includes a feedback system, the compensation network 208 may be needed to ensure stability. It is noted that depending on the type of output stage 214 and the exact topology of the voltage regulator 200 the location and the type of components included in this network may vary. Furthermore, in order to help the voltage regulator 200 react on sudden changes of Iload (e.g., during startup) and remain stable even if Iload is temporarily null, the quiescent current source 218 can be included in the output stage 214. Depending on the exact type of output stage 214 used, this quiescent current may be needed to properly bias the internal branches. However, although the quiescent current may be needed, it increases the current consumption of the voltage regulator 200. Typically, the larger the output current capability the larger the quiescent current which may be needed. Also shown is an Ibias pin that is used to provide a bias current used inside the amplifier 204. The quiescent current source 218 can usually be derived from internal current mirrors of the core 202. It is noted that all voltage regulators shown in the appended drawings, including the voltage regulator 200 shown in FIG. 2, may be low-dropout voltage regulators (LDOs).

Figure 3:
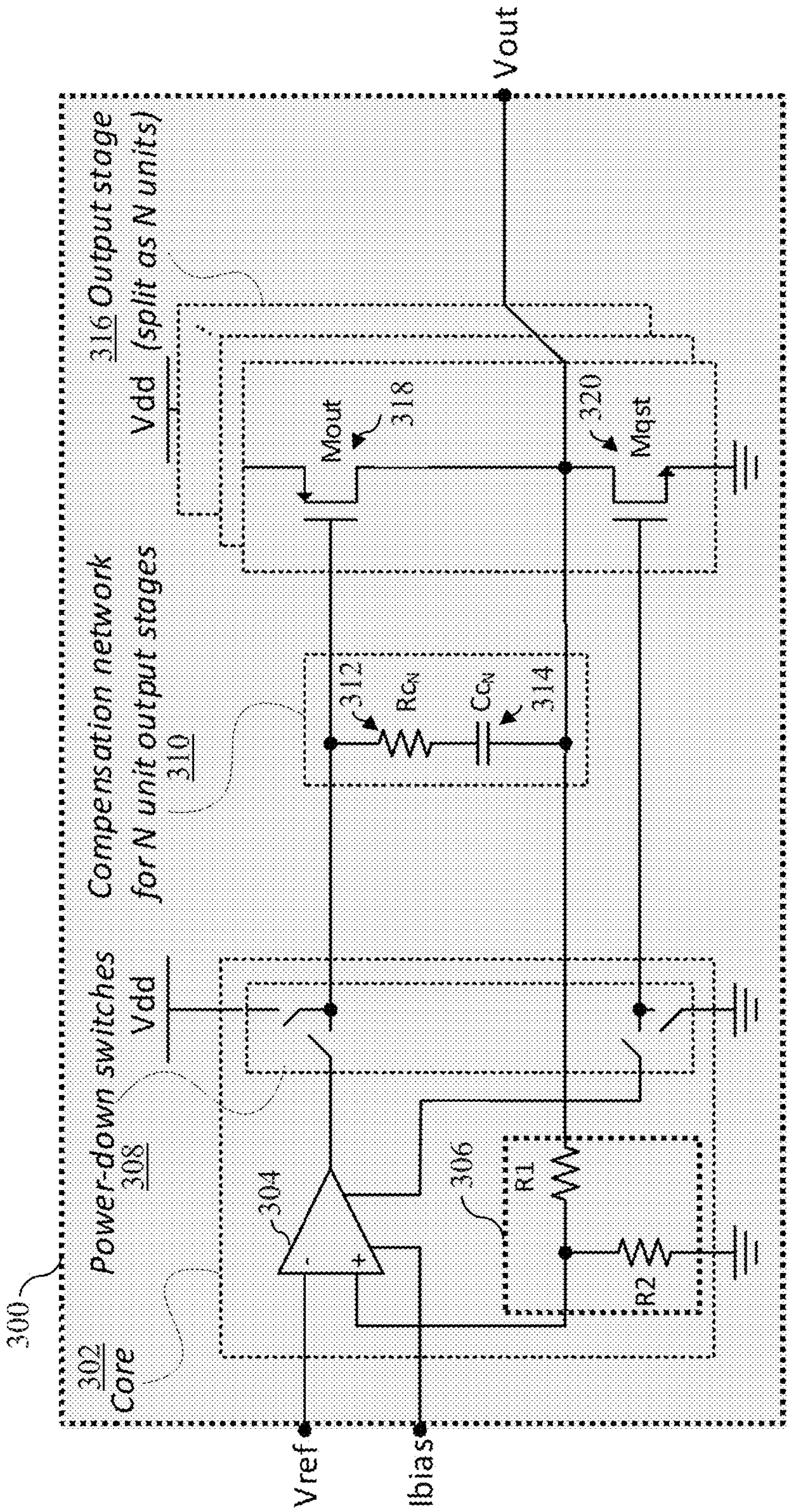
FIG. 3 shows another example of a voltage regulator.

FIG. 3 shows another example of a voltage regulator 300. The voltage regulator 300 comprises a core 302, which in turn comprises an amplifier 304 and a resistive divider 306. Furthermore, the voltage regulator 300 comprises an output stage 316 and a compensation network 310 coupled between the core 302 and the output stage 316. The output stage 316 is split as N units (wherein N represents a positive integer greater than one). More specifically, the output stage 316 comprises a set of N output stage units which may be configured to operate in parallel. In this example, the compensation network 310 comprises a resistor 412 and capacitance 314, whose values are chosen such that the compensation network 310 is configured to compensate for N output stage units. Furthermore, the core 302 comprises a block of power-down switches 308, which is configured to enable and disable the output stage 316 as a whole.

In a modern SoC several regulators are required to supply various analog blocks, where the requirements in terms of supply rejection, load current, load variation profiles, load capacitance, and other parameters may differ. Addressing these different needs with a unique circuit may be inefficient, because the only way to do so would be to design the circuit on the basis of all the combined, most stringent requirements, resulting in a very power-hungry circuit with a large area. On the other hand, developing a specific voltage regulator for each application or use case would cost a lot of development time. A middle ground that can work in most cases is to build an output stage unit that can be duplicated multiple times in a parallel arrangement, in order to offer the required current capability. In that case, the compensation network may likely require some tuning as a function of the total size of the output stage, but the core, output stage units and the set of switches used to disable the complete output stage for power-off can be re-used without modification from one design to the next. The effort to deliver multiple regulators for the analog section of a given product may therefore be reduced to a significant extent. An example of such a voltage regulator is shown in FIG. 3.

Figure 4:
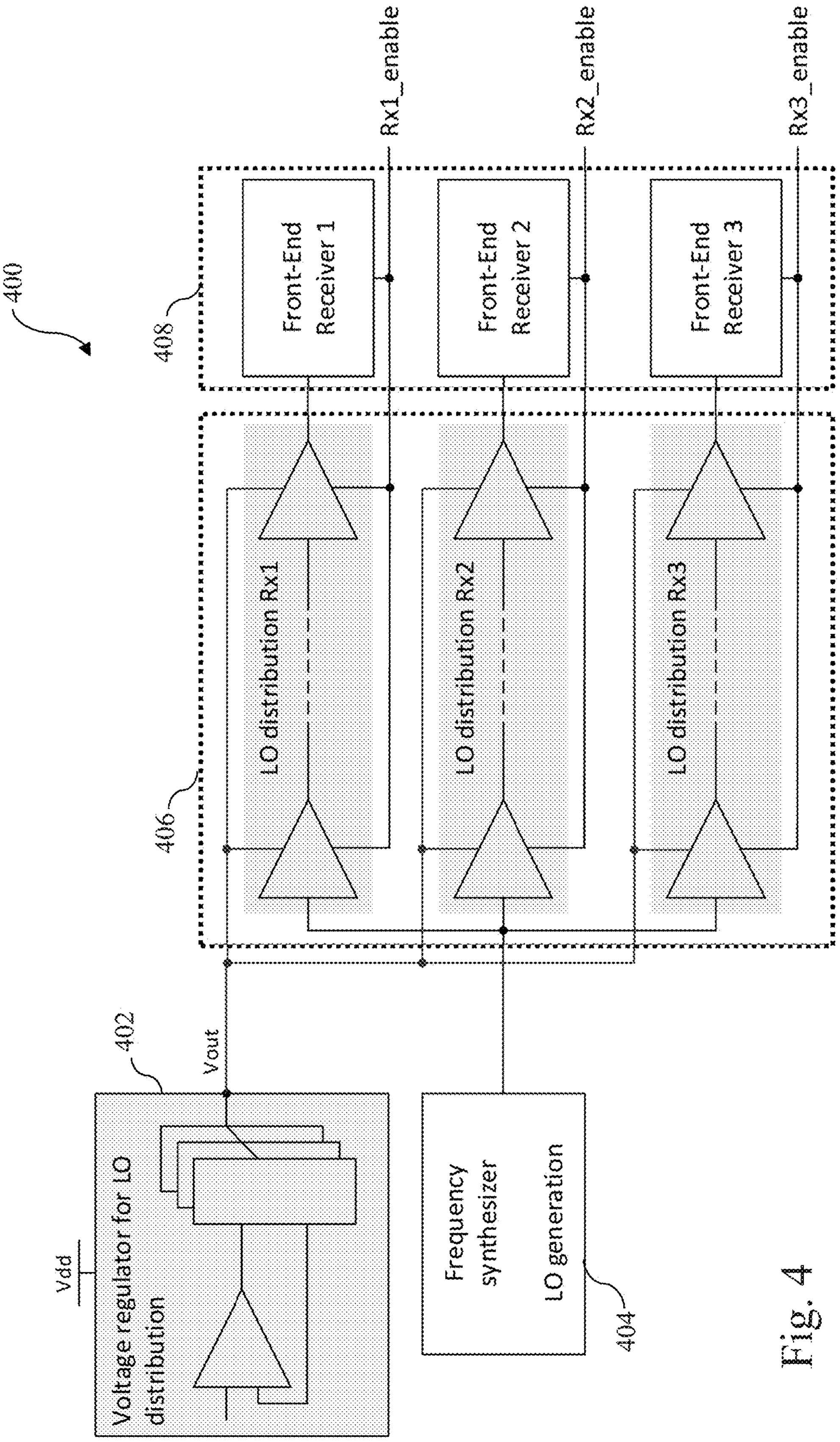
FIG. 4 shows an example of a system on a chip or a portion thereof.

FIG. 4 shows an example of a system on a chip or a portion thereof 400. The SoC or portion thereof 400 comprises a voltage regulator 402 configured to be used in a local oscillation (LO) distribution network. Furthermore, the SoC or portion thereof comprises a frequency synthesizer and LO generation block 404, a plurality of LO distribution paths 406 and a plurality of front-end receivers 408 coupled to an output of the respective LO distribution paths 406. In particular, the SoC or portion thereof 400 is an example of an integrated circuit in which a voltage regulator based on a modular approach, such as the voltage regulator shown in FIG. 3, may be used to advantage. A particular advantage is that the same general topology could be re-used in other sections of the SoC—thus saving development time—with a different number of output stages depending on the local requirements in terms of load currents. Generally speaking, the modular approach works well and will result in a voltage regulator that will work well with a load current anywhere between nil and a specified maximum amount. However, the current consumption of the voltage regulator itself may be large, because all the output stages (and their internal current loads) are enabled even if the operating mode of the supplied block would not require full current capability.

In particular, for circuits that can operate in multiple modes (e.g., an LO distribution network towards multiple receivers) having full current capability from the voltage regulator is not always necessary. In that case, the voltage regulator has a larger than necessary output stage and its own current consumption is accordingly also high. In the example shown in FIG. 4, if only one receiver and associated LO distribution path is active then only about one third of the total current capability of the voltage regulator 402 is needed if it has been scaled for a worst case scenario, according to which all three receivers could be enabled simultaneously. Consequently, in this case there is also an excess current consumption from the voltage regulator, which negatively impacts the overall current budget for the IC.

Now discussed are a voltage regulator and a corresponding method of configuring a voltage regulator, which facilitate avoiding a negative impact on the overall current budget for an integrated circuit in which the voltage regulator is used. In particular, the presently disclosed voltage regulator may have a reduced power consumption in certain operating modes, in which the total current capability of the voltage regulator is not needed. The presently disclosed voltage regulator may be implemented as a low-dropout voltage regulator, for example.

Figure 5:
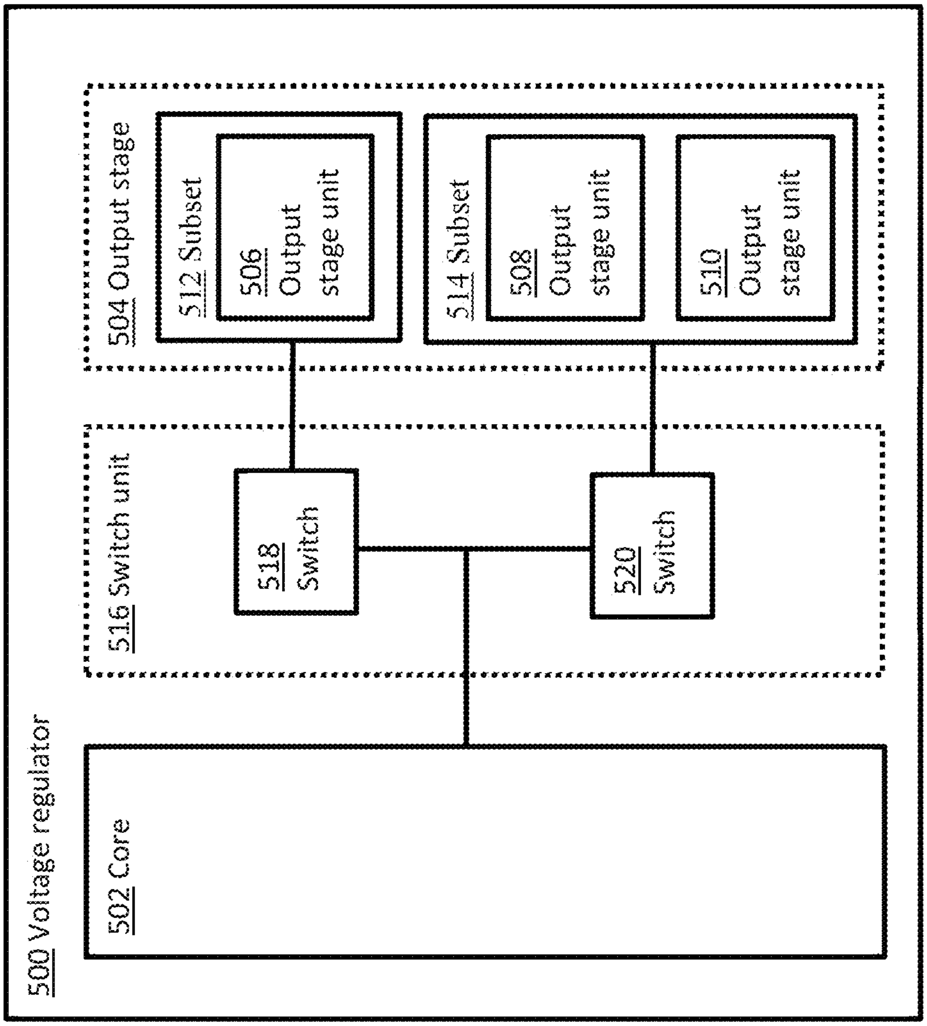
FIG. 5 shows an illustrative embodiment of a voltage regulator.

FIG. 5 shows an illustrative embodiment of a voltage regulator 500. The voltage regulator 500 comprises a core 602, an output stage 504 and a switch unit 516. The output stage 504 is configured to be coupled to the core 502. Furthermore, the output stage 504 comprises a set of output stage units 506, 508, 510. Furthermore, the switch unit 518 comprises a plurality of controllable switches 518, 520, wherein said controllable switches 518, 520 are configured to couple subsets 512, 514 of the set of output stage units 506, 508, 510 to the core 502. Since the switch unit 516 enables selectively enabling and disabling subsets 512, 514 of the set of output stage units 506, 508, 510, the power consumption of the voltage regulator 500 may be controlled in a more granular manner. For instance, for certain operating modes of an integrated circuit in which the voltage regulator 500 is used, both subsets 512, 514 may be activated to enable the voltage regulator 500 to operate at its maximum current capability, at the expense of a maximum internal current consumption of the voltage regulator 500. For other operating modes, only one of said subsets 512, 514 may be activated, to enable the voltage regulator 500 to operate at a smaller current capability, which still meets the needs of the integrated circuit when operating in said modes. At the same time, this results in a reduced current consumption inside the voltage regulator 500 itself as only fractions of the output stages are activated. Thus, a negative impact on the overall current budget for the integrated circuit may be avoided more easily.

In one or more embodiments, at least one of said subsets comprises a single output stage unit. In this way, the granularity with which the power consumption of the voltage regulator is controlled may be increased, which further facilitates avoiding a negative impact on the overall current budget for the integrated circuit. Furthermore, in one or more embodiments, at least one of said subsets comprises multiple output stage units. In this way, the number of switches used in the switch unit may be reduced, while still enabling a reduced power consumption of the voltage regulator for some operating modes. In one or more embodiments, the voltage regulator further comprises a programmable compensation network, wherein said programmable compensation network is configured to be coupled to the output stage. Since a programmable compensation network may adjust itself to the active size of the output stage (i.e., to the number of enabled output stage units), it may facilitate the implementation of a voltage regulator of the kind set forth herein. Furthermore, in a practical implementation, the programmable compensation network comprises a variable resistor.

In one or more embodiments, the switch unit is configured to be controlled such that the subsets of output stage units are coupled to the core in dependence on an operating mode of an integrated circuit in which the voltage regulator is used. In other words, the operating mode of the integrated circuit may be used as a control parameter, on the basis of which it is determined which subsets of the set of output stage units will be coupled to the core. In this way, the power consumption of the voltage regulator may easily be adjusted in dependence on the operating mode of the integrated circuit. For example, in a practical implementation, the switch unit is configured to be controlled such that different numbers of output stage units are coupled to the core for each one of a plurality of different operating modes of an integrated circuit in which the voltage regulator is used. Furthermore, in a practical implementation, each of the subsets comprises a predefined, fixed number of output stage units. Furthermore, in a particularly efficient implementation, the output stage units are grouped into the subsets according to a binary weighted scheme.

Figure 6:
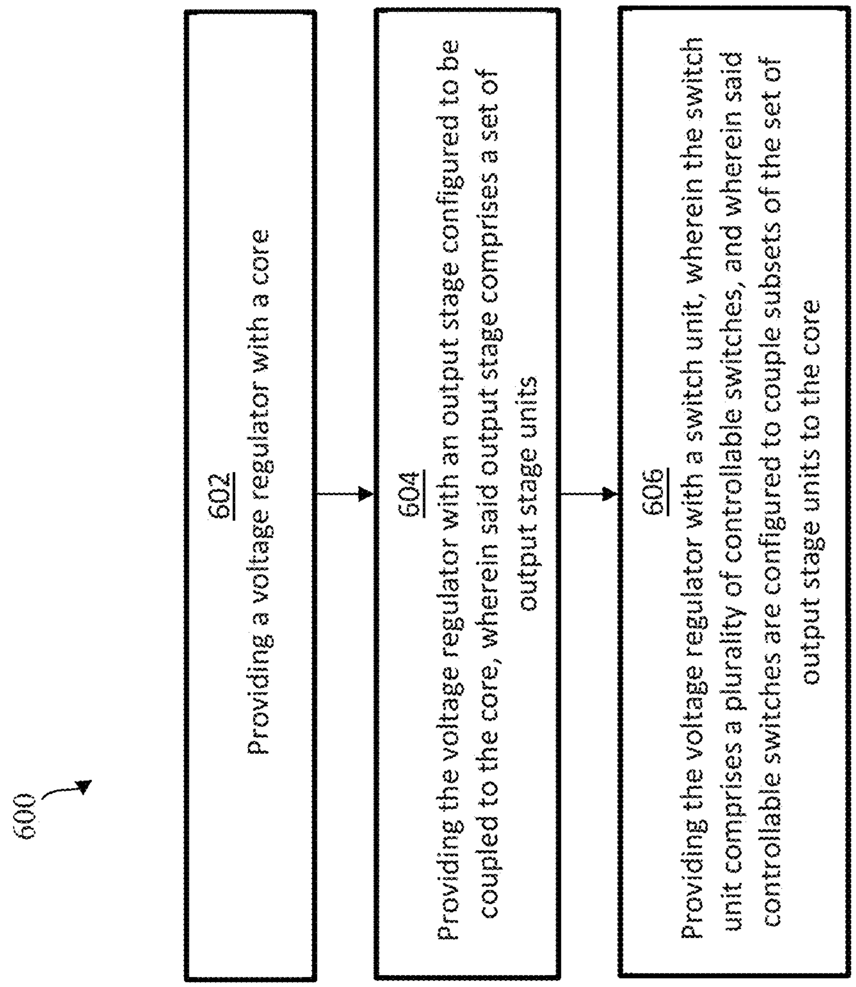
FIG. 6 shows an illustrative embodiment of a method of configuring a voltage regulator.

FIG. 6 shows an illustrative embodiment of a method 600 of configuring a voltage regulator. The method 600 comprises the following steps. At 602, the voltage regulator is provided with a core. Furthermore, at 604, the voltage regulator is provided with an output stage configured to be coupled to the core, wherein said output stage comprises a set of output stage units. Furthermore, at 606, the voltage regulator is provided with a switch unit, wherein the switch unit comprises a plurality of controllable switches, and wherein said controllable switches are configured to couple subsets of the set of output stage units to the core. As mentioned above, since the switch unit enables selectively enabling and disabling subsets of the set of output stage units, the power consumption of the voltage regulator may be controlled in a more granular manner. Thus, a negative impact on the overall current budget for the integrated circuit may be avoided more easily.

Figure 7:
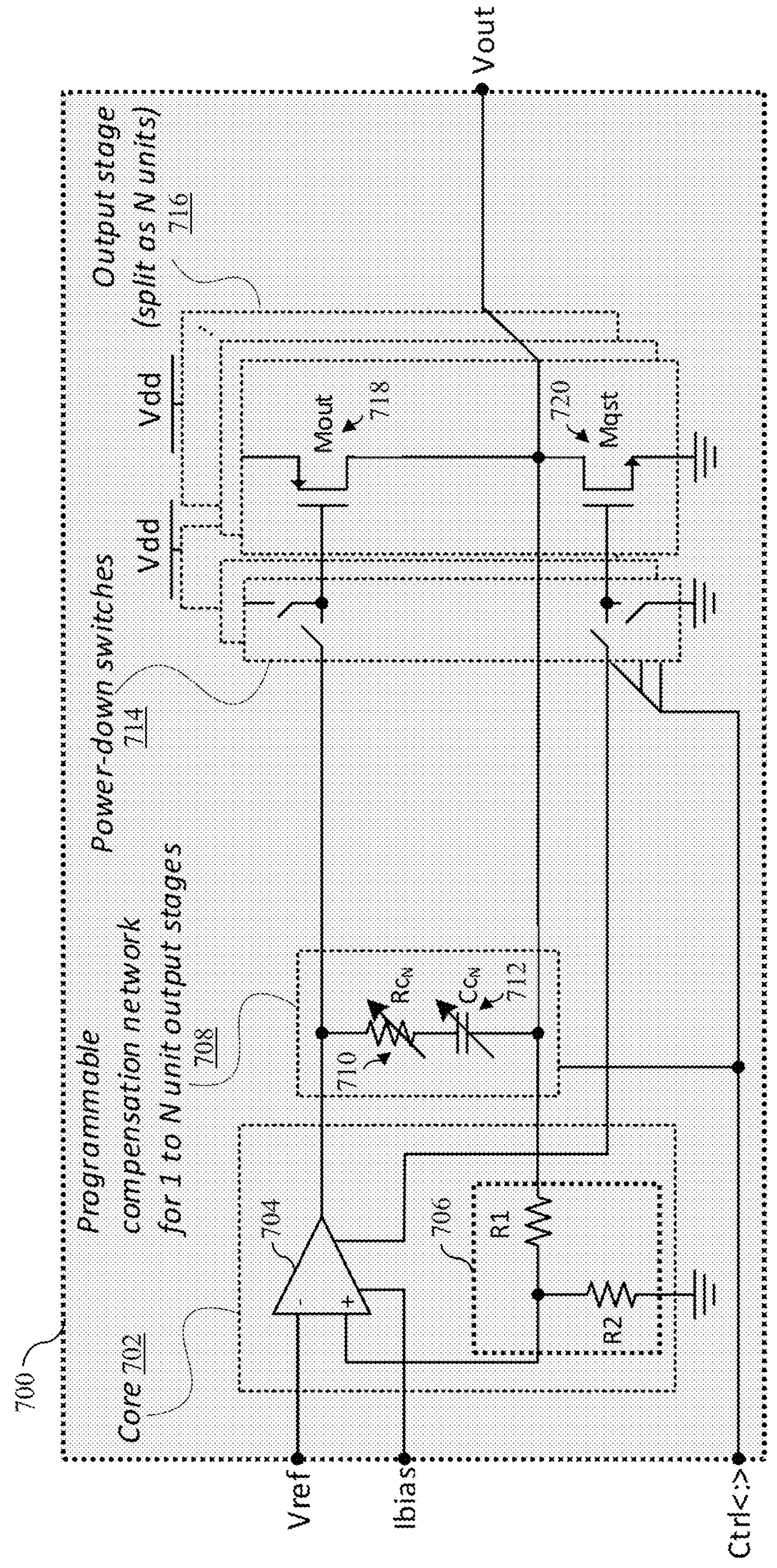
FIG. 7 shows another illustrative embodiment of a voltage regulator.

FIG. 7 shows another illustrative embodiment of a voltage regulator 700. The voltage regulator 700 comprises a core 702, which in turn comprises an amplifier 704 and a resistive divider 706. The skilled person will appreciate that the core 702 can also be implemented in a different manner, i.e. without an amplifier and resistive divider. For instance, in alternative embodiment, the core 702 may be based on a switched capacitor implementation, sigma-delta regulator or PWM regulator. Furthermore, the voltage regulator 700 comprises an output stage 716, which is split as N units. In other words, the output stage 716 comprises N output stage units (where N is a positive integer greater than one). In accordance with the present disclosure, the voltage regulator 700 is provided with a switch unit, wherein the switch unit comprises a plurality of controllable power-down switches 714, which are configured to couple subsets of the set of output stage units to the core 702. In this example implementation, each output stage unit comprises an output transistor 718 and a quiescent current transistor 720. Furthermore, in this example implementation, each subset comprises one of said output stage unit, such that the output stage units can effectively be enabled and disabled individually. Furthermore, the voltage regulator 700 comprises a programmable compensation network 708 for 1 to N output stage units, which in turn comprises a variable resistor 710 and a variable capacitor 712.

In the case of a voltage regulator supplying a circuit with multiple and significantly different levels of current consumption, it is more appropriate to have a scalable output stage, where for example one third, two thirds or all the output stage units can be enabled. The modular approach shown in FIG. 7 facilitates accomplishing this, by having separate power-down switches and controls for each subset of output stage units. Since each subset has one output stage unit in the implementation shown in FIG. 7, separate power-down switches and controls are effectively provided for each individual output stage unit. Since the compensation network 708 is programmable, it is able to adjust itself to the active size of the output stage 716. The general performance of the voltage regulator 700 can be maintained relatively constant as one third, two thirds or all of the output stages are enabled. However, the current consumption of the voltage regulator 700 can be scaled down significantly.

Figure 8A:
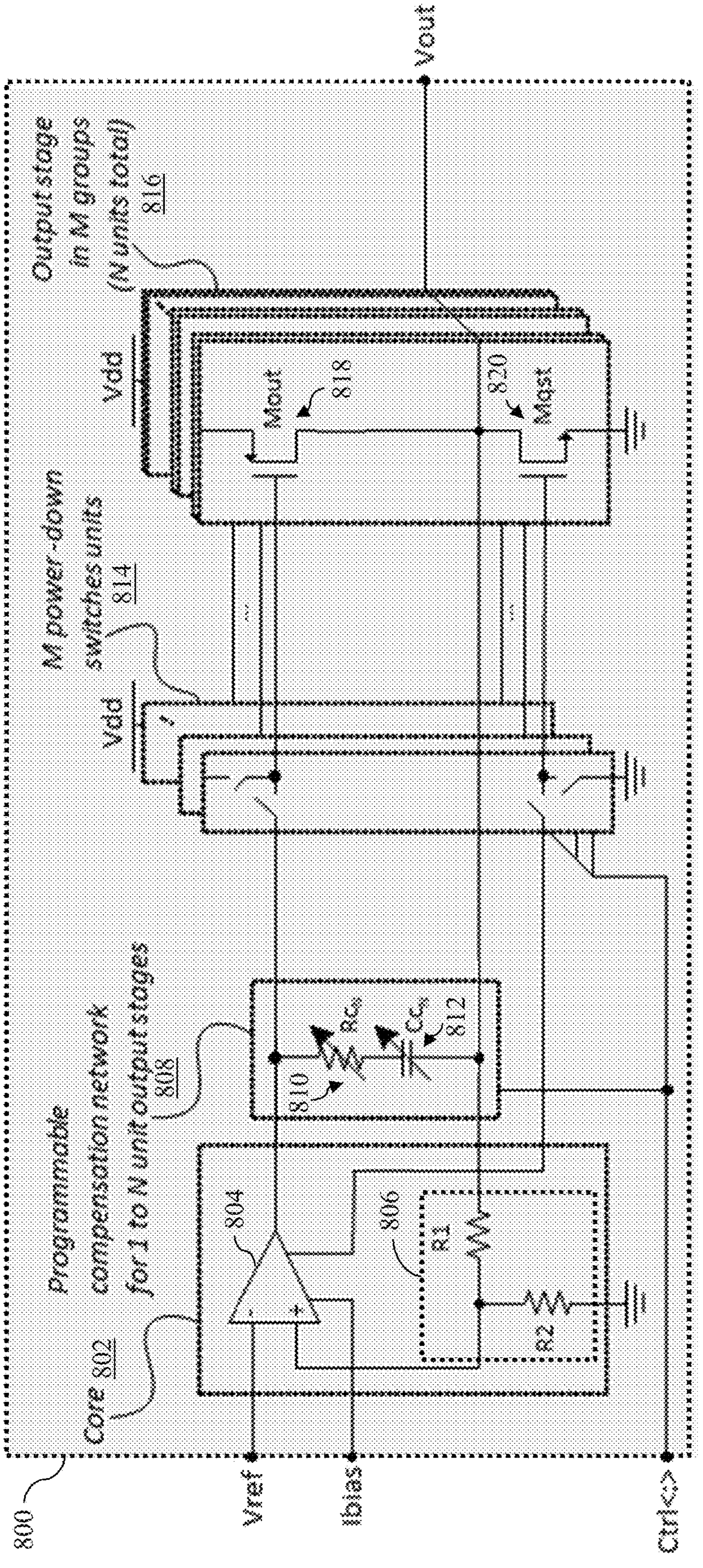
FIGS. 8A and 8B show further illustrative embodiments of a voltage regulator.
Figure 8B:
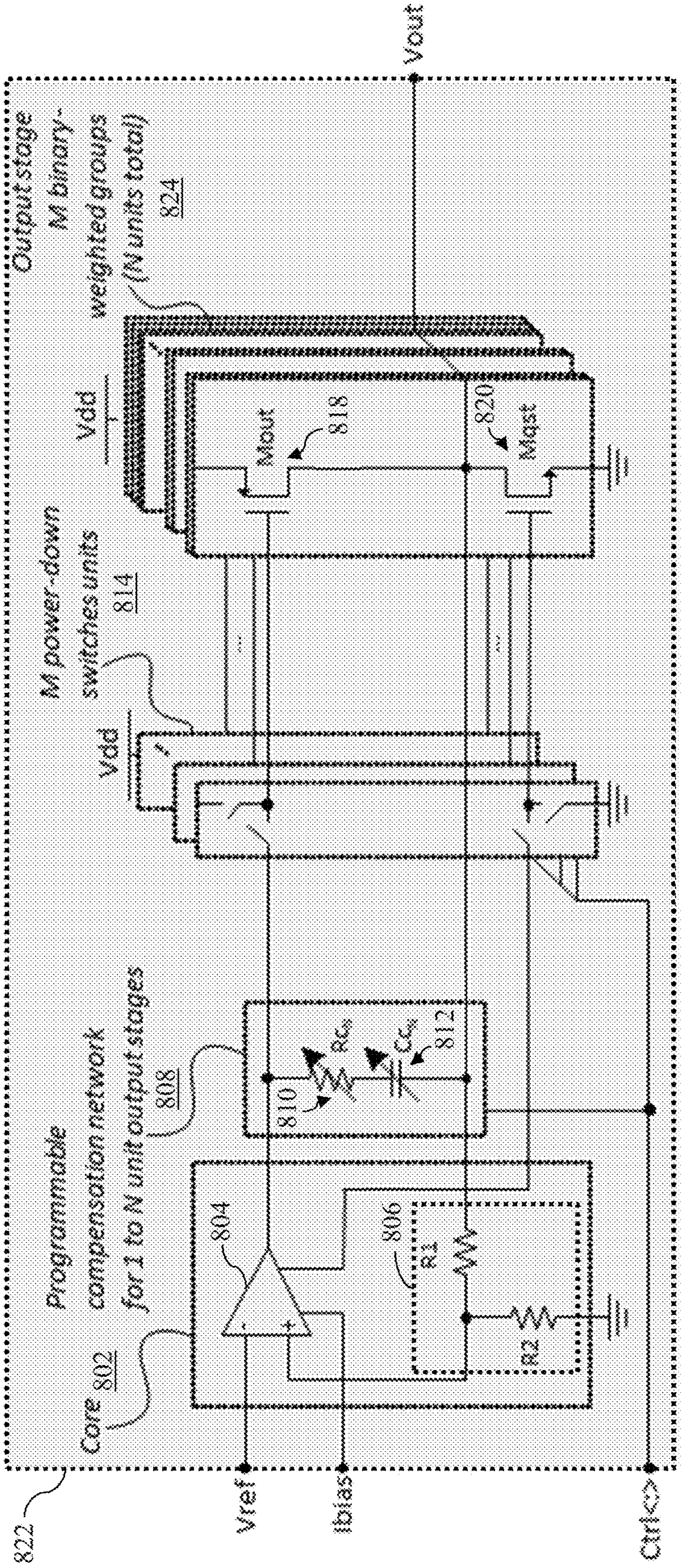

FIGS. 8A and 8B show further illustrative embodiments of a voltage regulator 800, 822. The voltage regulator 800 shown in FIG. 8A comprises a core 802, which in turn comprises an amplifier 804 and a resistive divider 806. Furthermore, the voltage regulator 800 comprises an output stage 816, which is split in M groups (i.e., subsets), and has a total of N output stage units. In other words, the output stage 716 comprises N output stage units (where N is a positive integer greater than one) distributed over M groups (where M is a positive integer greater than one, but smaller than N). In accordance with the present disclosure, the voltage regulator 700 is provided with a switch unit, wherein the switch unit comprises a plurality of controllable power-down switches 814, which are configured to couple subsets of the set of output stage units to the core 802. In this example implementation, each output stage unit comprises an output transistor 818 and a quiescent current transistor 820. Furthermore, the voltage regulator 800 comprises a programmable compensation network 808 for 1 to N output stage units, which in turn comprises a variable resistor 810 and a variable capacitor 812. The voltage regulator 822 shown in FIG. 8B is similar to the voltage regulator 800 shown in FIG. 8A. However, the N output stage units of the voltage regulator 822 are not merely distributed over M groups, but they are distributed over said groups according to a binary weighted scheme.

Grouping output stage units into subsets and providing a single switch for each of said subsets may be advantageous in several applications or use cases. For example, in case of a LO distribution network, two or more output stage units may be required to supply a single LO distribution group. In that case, all these output stage units may be grouped behind a unique power-down switch. This will result in area saving and improve the power supply rejection due to a reduction of parasitics related to the switches. Another possibility, which may be advantageous if a rather fine granularity is required, is to group the output stage units in a binary weighted fashion: a unit output stage and power-down switch controlled by the LSB of the control word, two output stage units and one power-down switch for the LSB+1, four output stage units and one power-down switch for the LSB+2, etc. Since the same building bricks are used in all cases, it is relatively simple to configure the voltage regulator for a particular use case. Furthermore, since the building bricks are the same as those needed for a modular voltage regulator that does not have a scalable output current capability, the design effort overhead of the voltage regulator 800, 822 shown in FIGS. 8A and 8B may be minimal.

Figure 9A:
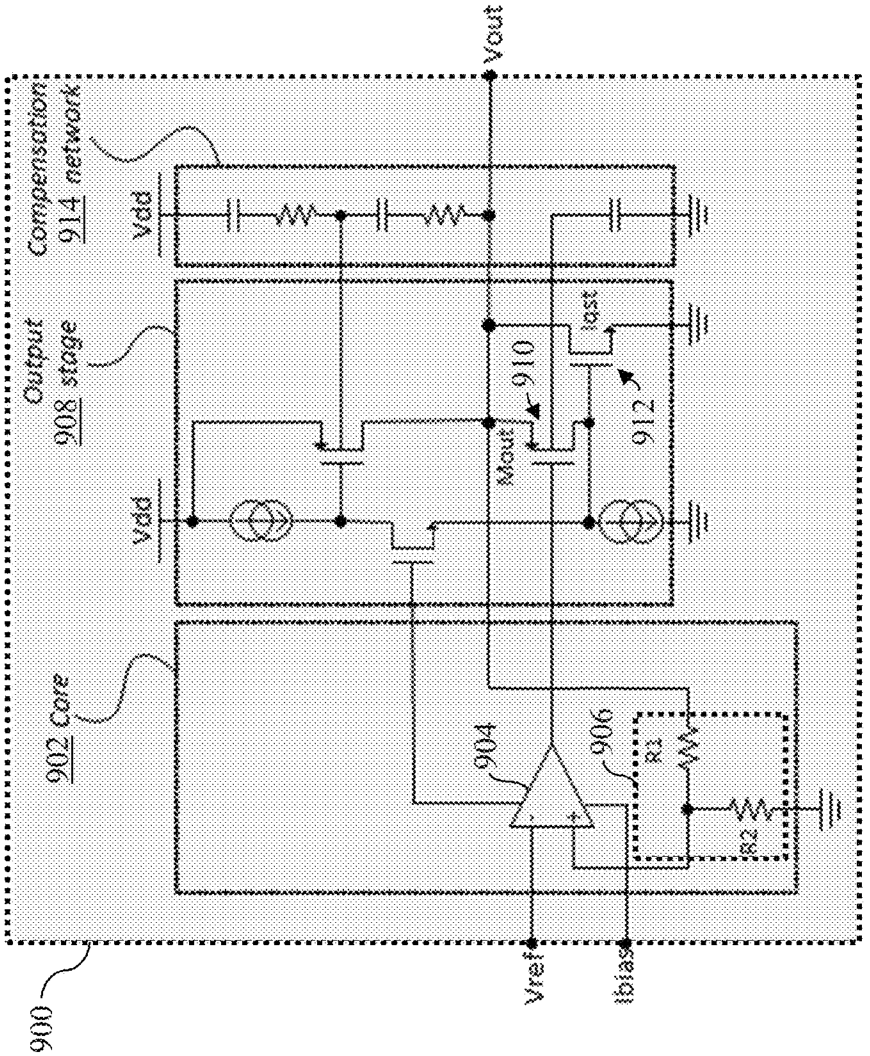
FIGS. 9A and 9B show further examples of a voltage regulator.
Figure 9B:
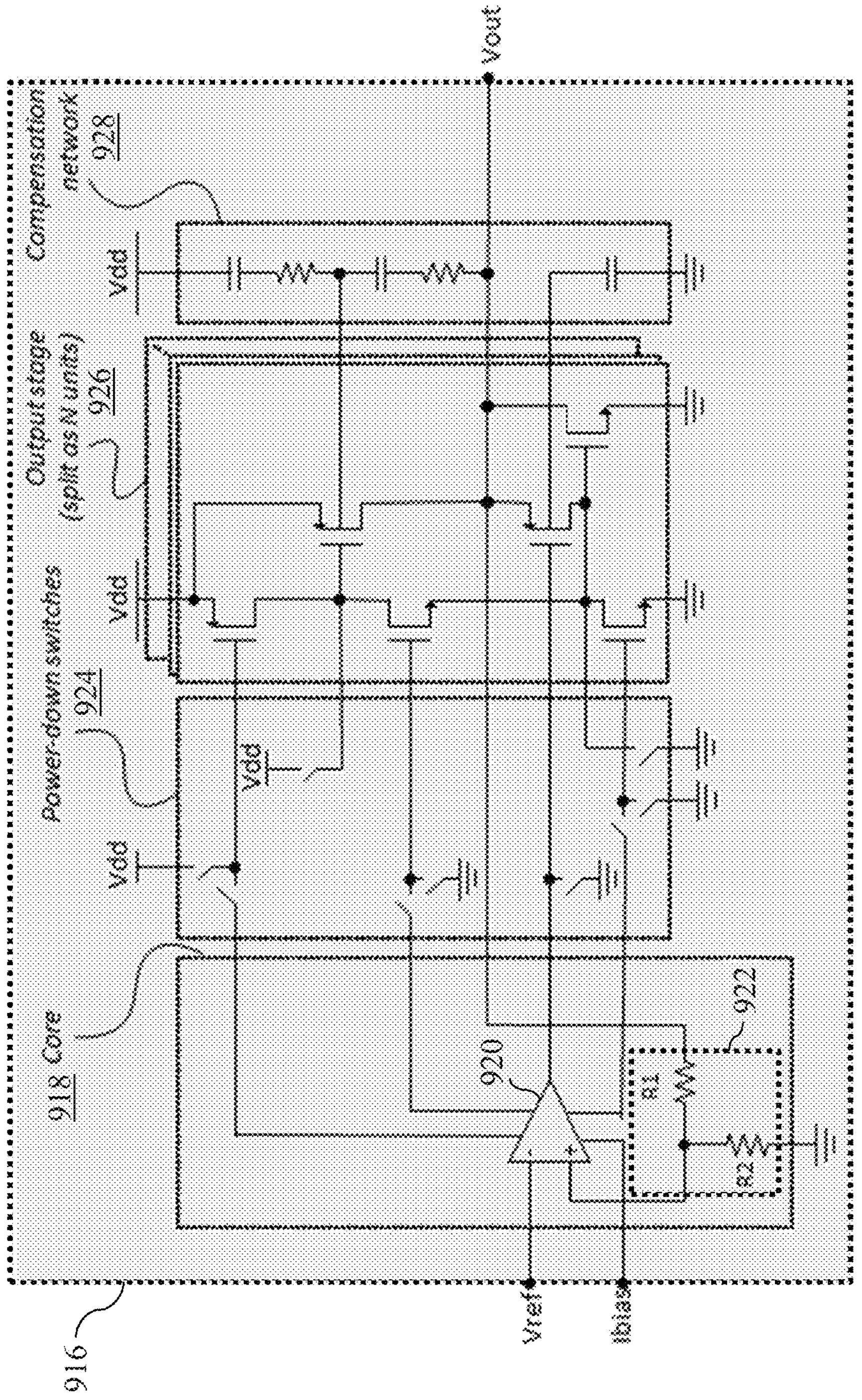

FIGS. 9A and 9B show further examples of a voltage regulator 900, 916. In particular, an alternative implementation of a voltage regulator 900, 916 is shown, in which a flipped-voltage-follower output stage is used. FIG. 9A shows such an alternative implementation in its basic form, while FIG. 9B shows the alternative implementation in a modular form. Similar to above-described voltage regulator based on a PMOS configuration, the voltage regulator 916 shown in FIG. 9B comprises an output stage 926 having N output stage units (where N is a positive integer greater than one). Power-down switches 924 are included to enable and disable all output stage units at once. As is the case for a PMOS-based voltage regulator, it would be desirable to control the power consumption of the voltage regulator 916 in a more granular manner. This may be achieved by the implementing the voltage regulator as shown in FIG. 10.

Figure 10:
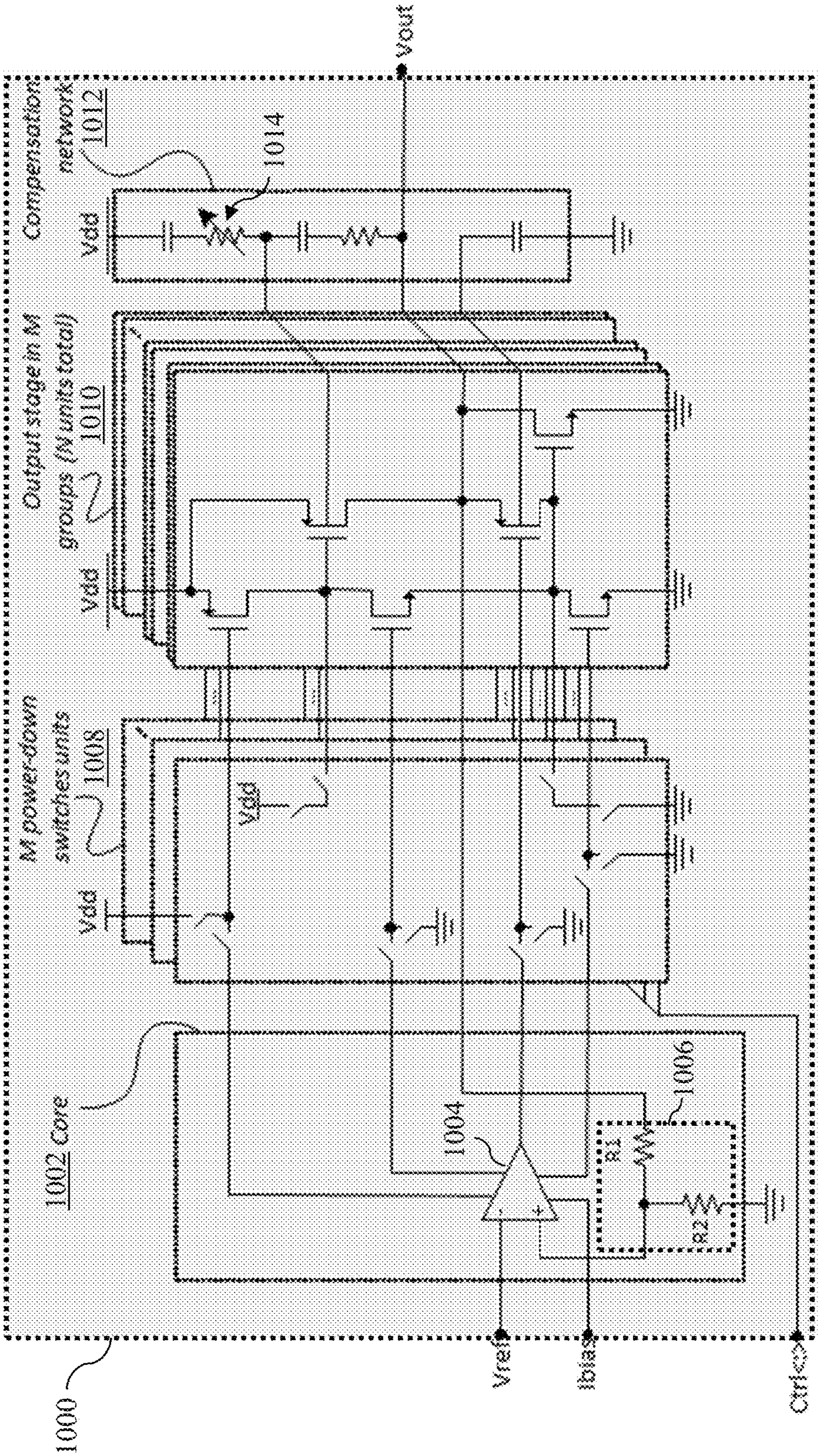
FIG. 10 shows a further illustrative embodiment of a voltage regulator.

FIG. 10 shows a further illustrative embodiment of a voltage regulator 1000. The voltage regulator 1000 comprises a core 1002, which in turn comprises an amplifier 1004 and a resistive divider 1006. Furthermore, the voltage regulator 1000 comprises an output stage 1010, which in turn comprises N output stage units (where N is a positive integer greater than one) distributed over M groups (where M is a positive integer greater than one, but smaller than N). In accordance with the present disclosure, the voltage regulator 1000 is provided with a switch unit, wherein the switch unit comprises a plurality of controllable power-down switches 1004, which are configured to couple subsets of the set of output stage units to the core 1002. Furthermore, the voltage regulator 1000 comprises a programmable compensation network 1012, which in turn comprises a variable resistor 1014.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS

100 application of a voltage regulator
102 voltage regulator
104 amplifier
106 resistive divider
108 output transistor
110 supplied circuit
112 load capacitance
114 load current
200 voltage regulator
202 core
204 amplifier
206 resistive divider
208 compensation network
210 resistor
212 capacitor
214 output stage
216 output transistor
218 quiescent current source
220 quiescent current transistor
300 voltage regulator
302 core
304 amplifier
306 resistive divider
308 power-down switches
310 compensation network for N output stage units
312 resistor
314 capacitor
316 output stage (split as N units)
318 output transistor
320 quiescent current transistor
400 system on a chip or portion thereof
402 voltage regulator for LO distribution
404 frequency synthesizer/LO generation
406 LO distribution paths
408 front-end receivers
500 voltage regulator
502 core
504 output stage
506 output stage unit
508 output stage unit
510 output stage unit
512 subset
514 subset
516 switch unit

518 switch
520 switch
600 method of configuring a voltage regulator
602 providing a voltage regulator with a core
604 providing the voltage regulator with an output stage configured to be coupled to the core, wherein said output stage comprises a set of output stage units
606 providing the voltage regulator with a switch unit, wherein the switch unit comprises a plurality of controllable switches, and wherein said controllable switches are configured to couple subsets of the set of output stage units to the core
700 voltage regulator
702 core
704 amplifier
706 resistive divider
708 programmable compensation network for 1 to N output stage units
710 variable resistor
712 variable capacitor
714 power-down switches
716 output stage (split as N units)
718 output transistor
720 quiescent current transistor
800 voltage regulator
802 core
804 amplifier
806 resistive divider
808 programmable compensation network for 1 to N output stage units
810 variable resistor
812 variable capacitor
814 M power-down switches units
816 output stage in M groups (N units total)
818 output transistor
820 quiescent current transistor
822 voltage regulator
824 output stage M binary-weighted groups (N units total)
900 voltage regulator
902 core
904 amplifier
906 resistive divider
908 output stage
910 output transistor
912 quiescent current transistor
914 compensation network
916 voltage regulator
918 core
920 amplifier
922 resistive divider
924 power-down switches
926 output stage (split as N units)
928 compensation network
1000 voltage regulator
1002 core
1004 amplifier
1006 resistive divider
1008 M power-down switches units
1010 output stage in M groups (N units total)
1012 compensation network
1014 variable resistor

The invention claimed is:

1. A voltage regulator, comprising:

a core and an output stage configured to be coupled to the core, wherein said output stage comprises a set of output stage units;

a switch unit comprising a plurality of controllable switches, wherein each controllable switch is configured to couple a corresponding subset of the set of output stage units to the core; and a programmable compensation network coupled to the output stage and configured to adjust based on a number of output stage units of the set of output stage units that are coupled to the core by the switch unit.

2. The voltage regulator of claim 1, wherein at least one of said subsets comprises a single output stage unit.

3. The voltage regulator of claim 2, wherein at least one of said subsets comprises multiple output stage units.

4. The voltage regulator of claim 1, wherein each output stage unit comprises an output transistor and a quiescent transistor coupled in series.

5. The voltage regulator of claim 1, wherein the programmable compensation network comprises at least one of: a variable resistor or a variable capacitor.

6. The voltage regulator of claim 1, wherein the switch unit is configured to be controlled such that subsets of output stage units are coupled to the core in dependence on an operating mode of an integrated circuit in which the voltage regulator is used.

7. The voltage regulator of claim 1, wherein the switch unit is configured to be controlled such that different numbers of output stage units are coupled to the core for each one of a plurality of different operating modes of an integrated circuit in which the voltage regulator is used.

8. The voltage regulator of claim 1, wherein each of the subsets comprises a predefined, fixed number of output stage units.

9. The voltage regulator of claim 1, wherein the output stage units are grouped into the subsets according to a binary weighted scheme.

10. The voltage regulator of claim 1, being a low-dropout voltage regulator.

11. A method of configuring a voltage regulator, the method comprising:

providing the voltage regulator with a core;

providing the voltage regulator with an output stage configured to be coupled to the core, wherein said output stage comprises a set of output stage units;

providing the voltage regulator with a switch unit, wherein the switch unit comprises a plurality of controllable switches, and wherein each controllable switch is configured to couple a corresponding subset of the set of output stage units to the core; and providing the voltage regulator with a programmable compensation network coupled to the output stage and configured to adjust based on a number of output stage units of the set of output stage units that are coupled to the core by the switch unit.

12. The method of claim 11, wherein the switch unit is configured to be controlled such that the subsets of output stage units are coupled to the core according to one of a binary weighted scheme or an operating mode of an integrated circuit in which the voltage regulator is used.

13. The method of claim 11, wherein at least one of said subsets comprises a single output stage unit.

14. The method of claim 13, wherein at least one of said subsets comprises multiple output stage units.

15. An integrated circuit, comprising:

a voltage regulator comprising:

a core and an output stage configured to be coupled to the core, wherein said output stage comprises a set of output stage units; and a switch unit comprising a plurality of controllable switches, wherein each controllable switch is configured to couple a corresponding subset of the set of output stage units to the core; and a programmable compensation network coupled to the output stage and configured to adjust based on a number of output stage units of the set of output stage units that are coupled to the core by the switch unit.

16. The integrated circuit of claim 15, wherein the programmable compensation network comprises at least one of: a variable resistor or a variable capacitor.

17. The integrated circuit of claim 15, wherein the switch unit is configured to be controlled such that the subsets of output stage units are coupled to the core according to one of a binary weighted scheme or an operating mode of the integrated circuit in which the voltage regulator is used.

18. The integrated circuit of claim 15, wherein the switch unit is configured to be controlled such that one or more selected output stage units are coupled to the core for each one of a plurality of different operating modes of the integrated circuit in which the voltage regulator is used.

19. The integrated circuit of claim 15, wherein each output stage unit comprises an output transistor and a quiescent transistor coupled in series.

* * * * *